United States Patent Office 3,779,954
Patented Dec. 18, 1973

3,779,954
BENZAZIMIDE COMPOUNDS AS BLOWING AGENTS
Wolf-Dieter Wirth, Odenthal-Hahnenberg, and Erwin Müller and Harry Röhr, Leverkusen, Germany, assignors to Bayer Aktiengesellschaft, Leverkusen, Germany
No Drawing. Filed Jan. 19, 1972, Ser. No. 219,169
Claims priority, application Germany, Jan. 23, 1971, P 21 03 198.1
Int. Cl. C08j 1/20
U.S. Cl. 260—2.5 R     12 Claims

ABSTRACT OF THE DISCLOSURE

The invention relates to the use of compounds of benzazimide or a substituted benzazimide as blowing agents to produce cellular and porous articles based on synthetic resins, particularly on thermoplastic resins.

---

This invention relates to the use of compounds of benzazimide or a substituted benzazimide as blowing agents for the production of cellular and porous articles based on synthetic resins, in particular for the production of foams from thermoplastic resins.

It is already known that foams may be produced from thermoplastic synthetic resins by incorporating an organic blowing agent with the synthetic resin or by applying a powder of a blowing agent which decomposes with evolution of gas at the temperature at which the synthetic resin becomes plastic over a synthetic resin granulate. Substances belonging to various classes of compounds have been described in the literature as being suitable for this purpose, e.g. diazoaminobenzenes, azo-bis-isobutyronitrile, dinitrosopentamethylenetetramine, N,N'-dinitroso-N,N'-dimethyltetraphthalamide, azodicarbonamide and benzene sulphonic acid hydrazides (see Angewandte Chemie, 64 [1952], pp. 65–76). Compounds belonging to these classes have, however, certain disadvantages which restrict their usefulness as blowing agent and which vary according to the nature of the synthetic resin with which they are incorporated. For example, the decomposition products liberated from the blowing agents may be acid or alkaline in reaction. They may also give rise to discolourations or have a toxic effect which may be disadvantageous, for example in the production of foam resins based on polyvinyl chloride. One disadvantage of azodicarbonamide, which has been described in German patent specification 871,835 and which is frequently used as blowing agent in practice, is the occurrence of ammonia in the decomposition gases, which gives rise to corrosion in the metal moulds used for the production of foams.

The various blowing agents differ from each other not only in the decomposition products liberated from them and the composition of the blowing gas produced but particularly also in their decomposition temperature at which the blowing gas required for the foaming process is liberated. The decomposition temperature may be affected by the synthetic resin material employed or by other substances added to the synthetic resin and may thus lie above or below the decomposition temperature determined in the pure blowing agent.

This invention provides a blowing agent which will not liberate any corrosive, discolouring, malodourous or toxic decomposition products and which is suitable for the production of higher melting thermoplastic resins which are processed for example at temperatures of about 150° C.– 300° C.

It has now been found that compounds of the substituted or unsubstituted benzazimides represented by the following general Formula I

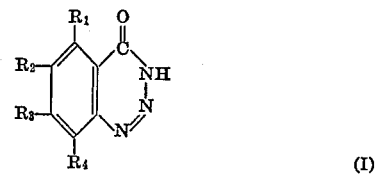

wherein $R_1$–$R_4$ denote, independently of each other, hydrogen, a straight or branched chain alkyl radical having 1–4 carbon atoms, a nitro group or a halogen atom, may be used as blowing agents for the production of cellular or porous synthetic resin articles.

The compounds according to the invention are particularly suitable for the production of foams from thermoplastic synthetic resins. They may be used for the following thermoplastic synthetic resins: polystyrene, copolymers of styrene or alkyl-styrene and acrylonitrile, polyethylene, polypropylene, copolymers of ethylene and propylene or of ethylene and vinyl acetate, polybutene, polymethylpentene, polyvinyl chloride, polyvinyl acetate, copolymers of vinyl chloride and vinyl acetate or of vinyl chloride and ethylene or of vinyl chloride and propylene, polymethacrylates, polymethacrylonitrile, polyamides, polyurethanes, polycarbonates, polysulphones, polyethylene terephthalate, polyacetal, polyphenylene oxide, and thermoplastic resins based on cellulose esters.

Mixtures of various thermoplastic polymers and so-called thermoplastic multi-phase synthetic resins may also be used for the production of foam resins with the aid of the blowing agents according to the invention. The following are examples:

Acrylonitrile-styrene-butadiene polymers, mixtures of polysulphone and styrene-acrylonitrile or acrylonitrile-butadiene-styrene polymers, mixtures of polyphenylene oxide and polystyrene, mixtures of polyacetal and polyurethane, mixtures of polycarbonate and acrylonitrile-butadiene-styrene polymers, mixtures of polyvinyl chloride with acrylonitrile-butadiene-styrene polymers or with ethylene-vinyl acetate copolymers, mixtures of polystyrene with rubbery elastic copolymers or segment polymers based on butadiene, styrene, and styrene-acrylonitrile copolymers with butadiene-acrylonitrile polymers.

According to a preferred embodiment of the invention, diphasic synthetic resins are used in which the hard phase, based on polystyrene or a copolymer of styrene and an alkyl-styrene or halo-styrene, is modified with a rubbery elastic phase based on butadiene to produce an impact-resistant product.

Other preferred diphasic synthetic resins are those in which the hard phase, based on copolymers of styrene and/or an alkyl-styrene and/or methyl methacrylate with acrylonitrile, are modified with a rubbery elastic phase based on butadiene and/or an acrylic acid ester, the alcohol component of which contains 1–6 carbon atoms in an aliphatic or cycloaliphatic chain, to produce an impact-resistant product. The rubbery elastic phase may also consist of other diene rubbers based on isoprene, cyclopentadiene, copolymers of butadiene and styrene or butadiene and acrylonitrile, ethylene-vinyl acetate copolymers or ethylene-propylene terpolymers, for example with dienes as the tercomponent.

Particularly preferred diphasic synthetic resins are those in which the hard phase, based on styrene and/or an alkyl-styrene and acrylonitrile, is modified with a rubbery elastic phase, based on butadiene, to produce an impact-resistant product, for example a diphasic resin composed of 5–60% by weight of butadiene polymer with not more than 30% of copolymerised styrene, isoprene or acrylonitrile and 95–40% by weight of polymerised styrene and acrylonitrile in proportion by weight of between 90:10 and 50:50, the styrene being optionally replaced partly or completely by α-methyl-styrene or methyl methacrylate.

Specific examples of radicals $R_1$–$R_4$ in the general Formula I are methyl, ethyl, n-propyl, isopropyl, n-butyl, isobutyl and tert.-butyl as alkyl radicals and chlorine, bromine and fluorine as halogen atoms.

Specific examples of compounds of Formula I are benzazimide, 5-methyl benzazimide, 6-methyl benzazimide, 7-methyl benzazimide, 8-methyl benzazimide, 6,8-dimethyl benzazimide, 6-ethyl benzazimide, 8-ethyl benzazimide, 6-tert.-butyl benazimide, 5-chlorobenzazimide, 6-chlorobenzazimide, 6,8-dichlorobenzazimide, 6 - bromobenzazimide, 6,8-dibromobenzazimide, 5-nitrobenzazimide, 6-nitrobenzazimide, 7-nitro-8-chloro-benzazimide, 6-chloro-8-methyl benzazimide and 7-nitro-8-methyl benzazimide.

The blowing agents according to the invention may be incorporated with the foaming mixtures by the usual methods, for example on mixing rollers, in internal mixers or in mixing containers equipped with stirrers. They may be added at the same time as other components of the mixture. The compounds of Formula I are generally added in quantities of 0.01–30% by weight, preferably 1–10% weight, based on the synthetic resin. The benzazimides of the general Formula I according to the invention may also be used in combination with other blowing agents which are known per se or have already been mentioned.

The mixture to be treated may also contain other known auxiliary agents, e.g. active or inactive fillers such as carbon black or chalk, antioxidants, antiozonants, stabilisers such as salts of lead, cadmium, calcium, zinc, tin or barium, waxes, dyes, pigments, zinc oxide, fatty acids, e.g. stearic acid, mineral oils, plasticisers such as dioctyl phthalate, butylnonyl phthalate, butylbenzyl phthalate, dibutyl phthalate, dibutyl adipate or tricresyl phosphate, lubricants or peroxides.

The compounds used according to the invention are prepared by known methods, e.g. as described in "Journal für Parktische Chemie," 35, 262 (1887) or 37, 432 (1888) by reacting the corresponding anthranilic acid amides with nitric acid. Benzazimide, which is the preferred substance, is obtained by reacting anthranilic acid amide with nitric acid and has a decomposition point of 220° C.–225° C. According to gas chromatographic analysis, the only decomposition products of this substance are nitrogen and water vapour. 6-nitrobenzazimide, which is obtained from 5-nitroanthranilic acid amide by reaction with nitric acid, has a decomposition point of 197° C. 6-chlorobenzazimide, which is obtained from 5-chloroanthranilic acid amide by reaction with nitric acid, has a decomposition point of 185° C.

The invention is further described with reference to the following examples.

EXAMPLE 1

The following substances were applied to mixing rollers at a temperature of 150° C. and homogenised by rolling for 10 minutes:

| | Parts |
|---|---|
| Commercial ABS graft polymer consisting of 20.5% acrylonitrile, 12.5% butadiene and 67.0% styrene | 96 |
| Benzazamide | 3.0 |
| Calcium stearate (lubricant) | 0.5 |
| Ionol (anti-aging additive) | 0.5 |

The rolled sheet was reduced to small pieces and made up into samples in an injection moulding machine at 220° C.–240° C. The amount of substance fed into the machine was calculated so that the samples produced had a crude density of 0.7 g./cm.³. The following properties were tested on the samples according to ASTM standard D790 and D256:

Flexural strength __ 416 kg./cm.².
Impact strength ___ 21 cm. kg. wt./cm. (Charpy ¼").

EXAMPLE 2

The following substances were applied to mixing rollers at a temperature of 140° C. and homogenised by rolling for 10 minutes:

| | Parts |
|---|---|
| Commercial styrene-acrylonitrile copolymer consisting of 75% styrene and 25% acrylonitrile | 96.5 |
| Benzazimide | 3.0 |
| Calcium stearate | 0.5 |

The rolled sheet was reduced to small pieces after cooling and then made up into test rods in an injection moulding machine at 220° C.–240° C. The amount fed into the machine was calculated so that the rods had a gross density of 0.7 g./cm.³. The following properties were determined according to test standards ASTM D790 and D256:

flexural strength _____ 526 kg./cm.².
Impact strength _____ 7 cm. kg. wt./cm. (Charpy ¼").

EXAMPLE 3

The granulate of a commercial high-impact-strength polystyrene consisting of 94% styrene and 6% butadiene was introduced into a paddle mixer (Lödige) and wetted by spraying it with 0.5% butyl stearate (based on the amount of granulate in the mixer) at room temperature. 1% (based on the amount of granulate in the mixer) of finely powdered benzazimide was then added and the components were mixed for 5 minutes. The granulate with blowing agent adhering to its surface was worked up in an injection extrusion screw at 185° C.–225° C. to produce test samples having a gross density of 0.75 g./cm.³. The following properties were determined according to ASTM standards D790 and D256:

flexural strength _____ 285 kg. wt./cm.².
Impact strength _____ 35 cm. kg. wt./cm.

EXAMPLE 4

The granulate of a commercial polymethyl methacrylate was introduced into a paddle mixer (Lödige) and wetted by spraying it with 0.5% butyl stearate (based on the amount of granulate) at room temperature. 1% (based on the amount of granulate) of finely powdered benzazimide was then added and the components were mixed for 5 minutes. The granulate with blowing agent adhering to its surface was worked up in an injection extrusion screw at 210° C.–250° C. to produce test samples having a crude density of 0.85 g./cm.³. The following properties were determined according to ASTM standards D790 and D256:

flexural strength _____ 547 kg. wt./cm.².
Impact strength _____ 8 cm. kg. wt./cm. (Charpy ¼").

EXAMPLE 5

A polyvinyl chloride paste having the following composition was prepared on a three-roll mill at room temperature: 40% PVC, K-value approximately 70 (commercial paste), 40% dioctyl phthalate, 10% benzimidate, 8% zinc oxide and 2% stabiliser mixture. The paste was introduced into a mould measuring 100 x 100 x 10 mm., heated to a temperature of 190° C. in a press under a pressure of 250 kg. wt./cm.² and left under those conditions for 5 minutes. After cooling, the resulting plate was removed from the mould and kept in heating cupboard at a temperature of 120° C. for 30 minutes. The foam product produced by expansion of the plate under these conditions had a crude density of 0.54 g./cm.³.

EXAMPLE 6

A mixture of 3000 parts by weight of a graft copolymer of 17.5% butadiene, 59.5% styrene and 23% acrylonitrile, 90 parts by weight of butyl stearate and 60 parts by weight of benzazimide was granulated in a double screw extruder at temperatures of between 120° C. and 145° C. The granulate was then made up into test samples in an injection moulding machine at a specific injection pressure of 800 kg. wt./cm.$^2$ and a material temperature of 250° C. The parts produced have a matt surface and a characteristic foam structure with partly open and partly closed pores. The crude density is 0.74 g./cm.$^3$.

EXAMPLE 7

A mixture of 89 parts of a polyethylene homopolymer having a density of 0.918 and a melt index of 1.8 (conditions: temperature 190° C., load 2.16 kg.), 10 parts benzazimide and 1 part dicumyl peroxide was homogenised on a roller for 10 minutes and then moulded into a test plate. This plate was heated to 220° C. inside an aluminium foil in a metal bath for 4 minutes. A fine porous foam with a regular pore structure and having a specific gravity of 0.04–0.05 g./cm.$^3$ is obtained.

What we claim is:

1. A process for the production of cellular or porous thermoplastic synthetic resin articles in which a compound of the formula

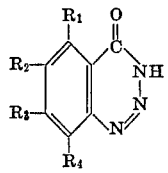

wherein $R_1$, $R_2$, $R_3$ and $R_4$ represent, independently of each other, hydrogen, a straight or branched-chained alkyl radical having 1–4 carbon atoms, a nitro group or a halogen atom is used as a blowing agent.

2. A process as claimed in claim 1 in which the blowing agent is benzazamide.

3. A process as claimed in claim 1 in which the blowing agent is used in a quantity of 0.01 to 30% by weight based on the weight of the thermoplastic synthetic resin article.

4. A process as claimed in claim 1 in which the thermoplastic synthetic resin is polystyrene, a copolymer of styrene or an alkyl-styrene and acrylonitrile, polyethylene, polypropylene, a copolymer of ethylene and propylene or ethylene and vinyl acetate, polybutene, polymethyl pentene, polyvinyl chloride, polyvinyl acetate, a copolymer of vinyl chloride and vinyl acetate, of vinyl chloride and ethylene or of vinyl chloride and propylene, a polymethacrylate, polymethacrylonitrile, a polyamide, a polyurethane, a polycarbonate, a polysulphone, polyethylene terephthalate, polyacetal, polyphenylene oxide or a thermoplastic synthetic resin based on a cellulose ester.

5. A process as claimed in claim 1 in which the thermoplastic synethetic resin is based on an acrylonitrile-styrene-butadiene polymer, a mixture of polysulphone and a styrene-acrylonitrile or an acrylonitrile-butadiene-styrene polymer, a mixture of polyphenylene oxide and polystyrene, a mixture of polyacetal and polyurethane, a mixture of a polycarbonate and an acrylonitrile-butadiene-styrene polymer, a mixture of polyvinyl chloride with an acrylonitrile-butadiene-styrene polymer or with an ethylene-vinyl acetate copolymer, a mixture of polystyrene with a rubbery elastic copolymer or a segment polymer based on butadiene, styrene, or a styrene-acrylonitrile copolymer with a butadiene-acrylonitrile polymer.

6. A process as claimed in claim 1 in which the thermoplastic synthetic resin is based on a diphasic synthetic resin in which the hard phase is based on polystyrene or a copolymer of styrene and an alkyl-styrene or a halo-styrene and is modified with a rubbery elastic phase based on butadiene.

7. A process as claimed in claim 1 in which the synthetic resin is based on a diphasic synthetic resin in which the hard phase is based on a copolymer of styrene and/or an alkyl-styrene and/or methyl methacrylate with acrylonitrile and is modified with a rubbery elastic phase based on butadiene and/or an acrylic acid ester having 1 to 6 carbon atoms in an aliphatic or cycloaliphatic chain of the alcohol component to produce a high impact strength product, in which other diene rubbers based on isoprene or cyclopentadiene may also be used as the rubbery elastic phase as may also copolymers of butadiene and styrene or butadiene and acrylonitrile or ethylene-vinyl acetate copolymers or ethylene-propylene terpolymers in which dienes are their ter component.

8. A process as claimed in claim 1 in which the synthetic resin is based on a diphasic synthetic resin in which the hard phase is based on a styrene and/or an alkyl-styrene and acrylonitrile and is modified with a rubbery elastic phase based on butadiene.

9. A process as claimed in claim 1 in which the synthetic resin is a diphasic synthetic resin having a composition of 5–60% by weight of butadiene polymer with not more than 30% of copolymerised styrene, isoprene and acrylonitrile and 95–40% by weight of polymerised styrene and acrylonitrile in proportion by weight of between 90:10 and 50:50, the styrene being optionally replaced partly or completely by α-methyl-styrene or methyl methacrylate.

10. A process as claimed in claim 1 in which another blowing agent is also present.

11. A process as claimed in claim 1 in which at least one member of the group consisting of active and inactive fillers, an antioxidant, antiozonant, a stabilizer, a wax, a dye, a pigment, a fatty acid, a mineral oil, a plasticiser, a lubricant and a peroxide is present.

12. A synthetic resin article which contains a compound of the formula

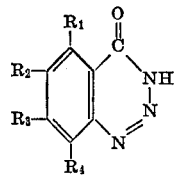

wherein $R_1$, $R_2$, $R_3$ and $R_4$ represent, independently of each other, hydrogen, a straight or branched-chained alkyl radicals having 1–4 carbon atoms, a nitro group or a halogen atom.

References Cited

UNITED STATES PATENTS

| | | | |
|---|---|---|---|
| 2,798,055 | 7/1957 | Sullivan | 260—2.5 R |
| 3,152,176 | 10/1964 | Hunter | 260—2.5 R |
| 2,828,299 | 3/1958 | Von Glahn et al. | 260—2.5 R |
| 2,766,227 | 10/1956 | Hardy et al. | 260—2.5 R |
| 2,912,391 | 1/1959 | Hardy et al | 260—2.5 R |

OTHER REFERENCES

"Journal für Praktische Chemie," 35, 262 (1887) and 37, 432 (1888).

MURRAY TILLMAN, Primary Examiner

M. FOELAK, Assistant Examiner

U.S. Cl. X.R.

260—2.5 HA, 2.5 HB, 30.6 R, 31.8 DR, 31.82, 33.6 UA, 33.6 A, 33.6 AQ, 41 R, 41.5 R, 45.75 R, 45.75 K, 248 AS, 858, 873, 874, 876 R, 887, 892, 893, 897 R, 897 C, 898